Patented Jan. 14, 1936

2,027,904

UNITED STATES PATENT OFFICE 2,027,904

METHOD OF POLYMERIZING MONO-SACCHARIDES

Eduard Färber, Heidelberg, Germany, assignor, by mesne assignments, to N. V. Internationale Suiker en Alcohol Compagnie International Sugar and Alcohol Company "Isaco", The Hague, Netherlands No Drawing. Application February 6, 1934, Serial No. 709,951. In Germany February 16, 1933

8 Claims. (Cl. 260—140)

In processes of obtaining carbohydrates from vegetable matter, very pure products can be obtained by crystallizing them in the form of monosaccharides (or monoses), but on the other hand there is a more extended and widespread use for pure polysaccharides. According to the present invention polysaccharides are produced from the monoses without the addition or production of harmful substances or by-products. In order to bring about this result the monoses are heated above their melting points in the presence of free mineral acids in amount so small that they need not be neutralized in the final product. Nor is it necessary to use either reduced or high pressure or to add anything beside the mineral acids.

In this new process, the time and the temperature are interrelated with respect to each other and also with the amount of free mineral acid present. The degree of polymerization can accordingly be regulated by variations of these three factors. In order to avoid side-reactions, high temperatures are preferably applied for short time intervals only.

For 100 parts of a monosaccharide, appreciably less than 0.1 part of the acids is used. At temperatures between 120°–180° C. a sufficient degree of polymerization is brought about in a few minutes. Carbohydrates of still higher molecular weights are obtained by heating for three to six hours at 120°–130° C., subsequent to the short treatment at the higher temperatures.

In the case of dextrose, 100 parts of the pure dextrose, either as anhydride or as the hydrate, are partially polymerized, when approximately 0.002 part of sulfuric acid is added and the mixture melted, heated to remove water of reaction and exposed to 175° C. for about thirty minutes. The product thus obtained is brittle after cooling, is easily soluble in water, and readily decolorizable. With 0.01 part of sulfuric acid in dextrose of low ash contents (0.1%) partial polymerization occurs in about ten minutes at 150° C. The time of reaction may be reduced to less than five minutes by using about .02 part of the acid.

In order to polymerize monosaccharides of higher ash contents than 0.1%, the amount of mineral acid must be correspondingly increased.

Equivalent quantities of other relatively strong mineral acids (i. e. having a relatively high degree of ionization under the conditions of use), such as hydrochloric or phosphoric acid have similar effects; but when a mixture of different acids is used, the effects are much greater. For instance, when polymerizing at 165° C. in twenty minutes, 0.002 part of sulfuric acid alone produces less than half the polymerization obtained with 0.001 part of sulfuric acid and 0.002 part of phosphoric acid mixed together; phosphoric acid alone is very slow in acting upon the sugars.

Products obtained from dextrose are likely to have a somewhat bitter after-taste. This can be avoided and at the same time carbohydrates of higher average molecular weights be produced by adding 0.01 to 0.02 part of mineral acids and maintaining a temperature of about 160° C. for about ten minutes. These products may be admixed with monomeric dextrose, for instance 25%, to get syrups equal to ordinary confectioners glucose after dissolving, decolorizing, and concentrating.

In the case of xylose, the conditions necessary for polymerization are somewhat milder than for hexoses. For example the temperature need not exceed the range of 125°–140° C. when about 0.01 to 0.02 part of sulfuric acid or other relatively strong mineral acid is present in 100 parts of xylose, the treatment requiring only several minutes.

The mineral acid added need not be neutralized, the amount thereof being so small as to be within the limits of permissible acid content.

In practice, the sugar is mixed with a dilute solution of the acid or acids, melted in a vessel under agitation or stirring and is then further heated therein until the desired degree of polymerization is attained. Or the process may be carried out by continuously flowing the melted material through tubes whose heat is maintained at the proper point while the flow of the material through the tubes is regulated to correspond to the desired time factor. The method may also be carried out in connection with heated cylinders and this latter method is particularly advantageous when highly polymerized carbohydrates are to be made at temperatures of the order of 170° C. or higher, since the material under these conditions becomes very viscous.

Too long extended treatment at such high temperatures tends to decompose the carbohydrates without further polymerization. Contrary to expectation the polymerization goes on at lower temperatures provided the high-temperature phase has preceded.

This subsequent polymerization can be carried out at 120°–130° C. but it is slow compared with the previously described procedure, requiring from three to six hours. Polysaccharides prepared in this way resemble dextrines as to their low reduction power towards Fehling's solution and their low hygroscopicity. By the use of the process of this invention it is possible to produce a kind of glucose syrup composed of the highly polymerized carbohydrates in admixture with other products obtained ascording to this invention and with monosaccharides.

It will be observed that the polysaccharides produced by the application of the new process result from the limitation of the acids to amounts materially less than 0.1 part to 100 parts of the carbohydrates and that the heat treatment is limited in intensity to temperatures which are in each instance below those which cause material decomposition.

These polysaccharides are mainly polymerized monoses essentially of a new type, not fermentable by ordinary yeast and not hydrolized by enzymes like diastase.

The acids are added in the form of solutions, as for example in the case of sulfuric acid, $H_2SO_4$ of 10° Bé. The percentages of the acids hereinabove are computed on the basis of the chemical formulae; for instance to 100 kg. of glucose are added 140 g. of the sulfuric acid of 10° Bé., containing 15 g. of $H_2SO_4$.

Practically all of the water component of the acid solution evaporates off during the heat treatments together with the water of reaction.

During the heating, the mixture becomes more and more viscous; the end of the reaction is easily determined by the degree of viscosity, which corresponds exactly to the stage of polymerization.

I claim:

1. The method of polymerizing carbohydrates which comprises melting carbohydrate monoses with materially less than 0.1 part (per 100 parts of the carbohydrates) of free strong mineral acid, heating to remove water and applying temperatures between 120°–180° C. and below those which cause material decomposition.

2. In the method set forth in claim 1, applying temperatures of 140°–170° C. for a few minutes only.

3. In the method set forth in claim 1, applying temperatures of 140°–170° C. for a few minutes only and subsequently of 120°–130° C. for several hours.

4. In the method set forth in claim 1, using mixtures of at least two of the following acids, to wit: sulfuric, hydrochloric, and phosphoric acids.

5. In the method set forth in claim 1, heating approximately 100 parts of glucose hydrate with about 0.01–0.02 part of the mineral acid addition for about twenty minutes at 140°–160° C.

6. In the method set forth in claim 1, heating approximately 100 parts of glucose hydrate with about 0.01–0.02 part of the mineral acid addition for about ten minutes at 160°–170° C.

7. In the method set forth in claim 1, heating approximately 100 parts of glucose hydrate with about 0.01–0.02 part of the mineral acid addition for about ten minutes at 160°–170° C. and subsequently heating at 120°–130° C. for about five hours.

8. In the method set forth in claim 1, heating about 100 parts of xylose with about 0.01–0.02 part of the mineral acid addition for several minutes at about 125°–140° C.

EDUARD FÄRBER.